United States Patent [19]

Johnson et al.

[11] 4,257,812

[45] Mar. 24, 1981

[54] FIBROUS REFRACTORY PRODUCTS

[75] Inventors: Thomas A. Johnson; William G. Long, both of Lynchburg, Va.

[73] Assignee: The Babcock & Wilcox Company, Del.

[21] Appl. No.: 4,103

[22] Filed: Jan. 17, 1979

[51] Int. Cl.$^3$ .................... C04B 33/00; C04B 35/82
[52] U.S. Cl. .................... 106/67; 106/73.4; 106/73.5
[58] Field of Search ............ 106/65, 67, 73.5

[56] References Cited

U.S. PATENT DOCUMENTS

| | | | |
|---|---|---|---|
| 3,348,957 | 10/1967 | Chaklader et al. | 106/67 |
| 3,510,394 | 5/1970 | Cadotte | 106/73.5 X |

OTHER PUBLICATIONS

Dodd, A. E.-Dictionary of Ceramics-pub. by Philosophical Library Inc., N.Y.C., "Metakaolin" pp. 178–179.

*Primary Examiner*—Helen M. McCarthy
*Attorney, Agent, or Firm*—Robert J. Edwards; Robert H. Kelly

[57] ABSTRACT

A fibrous refractory product adapted for use in contact with molten aluminum and its alloys consisting essentially of alumino-silicate fiber and kaolin clay in the metakaolin phase. The refractory product is readily machinable before firing.

1 Claim, No Drawings

FIBROUS REFRACTORY PRODUCTS

TECHNICAL FIELD

This invention relates to alumino-silicate refractory products, and improved compositions thereof, for use in contact with molten aluminum and its alloys.

BACKGROUND ART

In the handling of molten aluminum and its alloys, it is highly desirable to utilize refractory products per se, or refractory lined parts having low thermal conductivity, which are chemically inert to the molten metal. These products, for example, may take the form of pressed boards used for baffles or the lining launder systems, or tubular members through which the molten metal may be poured during transfer process.

The machineability of these products is important as machining in the aluminum industry is generally accomplished using standard wood working machines and techniques. Since a wide variety of shapes are utilized, it is more economical to machine parts than to order sized components. Typical applications may require cutting, drilling, tapping, trepanning, thread grinding or milling, sanding, the use of forming tools such as lathes to form curved surfaces or those of stepped, angular or irregular shape, or techniques which otherwise produce an edge which must be retained in service. For example, a continuous thread may be turned on a tubular member.

Materials have been used in the past which also possessed other desirable properties for success in molten aluminum application such as dimensional stability, spall resistance, and resistance to thermal and mechanical shock. Fibrous refractories, such as are disclosed in U.S. Pat. Nos. 3,269,849 and 3,294,562, are known to have particular utility in this regard. However, such refractories contain predominant amounts of asbestos fibers, and asbestos has now been linked to as a cause of at least three major diseases—asbestosis, lung cancer and mesothelioma. Due to the fact that many aluminum shops have become accustomed to working with wood working machines and techniques which may generate atmospheric contaminants, it has become highly undesirable to utilize refractories having asbestos fibers. Many fibrous refractory compositions, however, can not be used in lieu of asbestos fiber systems since, in application, the fibers or the composition would either disintegrate or have insufficient heat resistance, or otherwise not exhibit the desired properties described above with respect to molten aluminum exposure.

Thus, there exists a need for a suitable substitute for the asbestos refractory products which is amenable to the maching operations described while having characteristic properties similar to those of the previously used asbestos fibrous refractories.

SUMMARY OF THE INVENTION

The present invention is directed to an alumino-silicate fiber kaolin clay composition refractory product, for use in molten aluminum applications, containing no asbestos and yet possessing advantageous properties similar to products which contain asbestos. The unique alumino-silicate fiber and kaolin clay composition assures excellent compatibility of the products at elevated temperatures.

A composition consisting essentially of an alumino-silicate ceramic fiber, kaolin clay, plasticizers, water and lubricants is pressed or extruded into a desired shape and dried to remove the mechanical water. In the dried unfired state, the product is fired at elevated temperature to drive off chemical water and transform the clay into the metakaolin phase.

The various features of novelty which characterize the invention are pointed out with particularity in the claims annexed to and forming a part of this specification. For a better understanding of the invention, its operating advantages and specific objects obtained by its use, reference should be had to the accompanying descriptive matter in which there is described a preferred embodiment of the invention.

DESCRIPTION OF THE PREFERRED EMBODIMENTS

In accordance with the invention there is provided an alumino-silicate product, consisting essentially of alumino-silicate ceramic fiber and kaolin clay.

A suitable alumino-silicate ceramic fiber is produced under the trademark "Kaowool" in lengths up to four inches. Kaowool ceramic fiber typically has a melting point of 3,200° F. (2,033° K.), an average fiber diameter of 2.8 microns, specific gravity of 2.56, specific heat at 1,800° F. (1,255° K.) mean of 0.255 Btu/lb/F(1067.6 J/kg°K.), fiber tensile strength of $1.9 \times 10^5$ lbs/sq. in. 1,310 MPa) and fiber tensile modulus of $16.8 \times 10^6$ lbs/sq in. (116 GPa). Kaowool ceramic fiber has low thermal conductivity, low heat capacity, and is extremely resistant to thermal shock.

The alumino-silicate fiber and kaolin clay, such as "Albion" (trademark) kaolin clay, is dry mixed in a muller-type mixer for a period of several minutes. Additives or lubricants or both, to provide workability to aid in forming the composition into the desired forms (such as pressed board or extruded shapes) are then added. Finally, water is added until a desired consistency is achieved since the fiber tends to reduce plasticity. In the preferred embodiments, bentonite or ball clay is added to the composition to impart plasticity and act as a binder. The composition is mixed for a period on the order of one hour to form a plastic mix which is shaped by extruding or pressing. Plasticity may be increased by de-airing.

Several types of lubricants or additives have been successfully utilized including a ligno-sulfate lubricant binder marketed as "Marisperse 43" by the American Can. Co.; a wax water emulsion by the Mobil Oil Co. known as "Mobilcer C"; an ammonium salt of alginic acid from the Kelco Co. marketed under the trademark "Superloid"; and an alumina binder in the form of a fine powder of alumina hydrate marked under the trademark "Dispal" by Philadelphia Quartz Co. The Dispal alumina binder provides some binding properties upon drying.

After shaping, the shaped product is dried to remove mechanical water (water in a mix that is absorbed onto the particles, absorbed into the pores of a material, held in by capillary action; generally, water that is not chemically bonded to any of the materials). The dried unfired product may then be machined using standard wood working tools and procedures. Once machined, the refractory is fired to an elevated temperature to drive off the lubricants and the chemical water (water held in chemical bond, known also as "water of crystallinity") and transform the clay into the metakaolin phase. The metakaolin phase is initiated at approximately 800° F.

(700° K.), when the chemical water in the kaolinite crystal is driven off leaving an amorphous material known as metakaolin. At approximately 1,800° F. (1,255.0° K.), this material abruptly decomposes and subsequently forms alumina, mullite and free silica. The metakaolin phase of kaolin has been determined to be particularly resistant to wetting and reaction by molten aluminum. The firing produces a strong, stable part, which has been judged to have comparable mechanical properties to fibrous refractories previously used in the aluminum industry.

Compositions with additives which were intended to reduce the wetting of the refractory products by aluminum are shown in Table I. These compositions were mixed, extruded, and then pressed into 3-inch by 5-inch boards approximately ½-inch thick. The boards were dried overnight at 200° F. (366.5° K.). Holes were drilled in the boards for purposes of securing the board as samples to the walls of a launder trough for molten aluminum. The boards were fired to 1,200° F. (822.0° K.) and exposed to molten aluminum. The specimens made from mix numbers 2, 3 and 4 displayed almost no interaction between the specimens and the aluminum. The specimen of mix 4 cracked but this was deemed due to procedure used to press the board.

The invention may be more clearly understood by reference to the following examples.

EXAMPLE I

In this example 3,000 grams of chopped Kaowool ceramic fiber, 1,620 grams of kaolin clay, 645 grams of bentonite clay, 3.6 grams of sodium silicate, 300 grams of kyanite (−200 M/F) and 3,600 ml of water were blended and extruded into a tube measuring 2¾ inches (69.9 mm) outside diameter and 1¾ inches (44.4 mm) internal diameter. The tube was air dried at 200° F. (366.5° K.). A six inch (152.4 mm) section of the tube was then placed in an alumina crucible with a piece of aluminum (6061 alloy). The crucible was placed in a furnace and heated to 1,500° F. (1,089.0° K.) for 150 hours. At this temperature the aluminum became molten. Approximately two inches of the tube was exposed to the molten metal. No dimensional changes were observed in the tube following the test. There was very little wetting by the aluminum. Only a very slight reaction was observed at the aluminum to tube interface after the tube was sectioned and metal removed.

EXAMPLE II

Compositions, as shown in Table II, were examined to determine properties such as relative linear shrinkage, density and modulus of rupture. Additives such as Marisperse 43 and Mobilcer C were provided to promote workability as the fiber tends to reduce plasticity. All of the compositions extruded well. Shrinkage values were obtained on extruded round bars, with measurements taken over a six-inch (152.4 mm) span. Half inch (12.7 mm) thick boards were pressed from composition 2 and dried overnight at 200° F. (366.5° K.). A two-inch (50.8 mm) by eight inch (201.6 mm) section of this board was exposed to molten aluminum in a laundering trough for five days. Very little chemical attack was observed on the specimen at the end of the test.

An alumino-silicate fibrous refractory composition which has been found to give a most satisfactory product contains the following approximate percentages by weight:

|  | Percent |
| --- | --- |
| Alumino-silicate fiber | 42.7 |
| Kaolin clay | 21.4 |
| Bentonite clay | 10.7 |
| Marisperse 43 (50% solution) | 6.1 |
| Mobilcer C | .776 |
| H₂O (½% Superloid) | 8.5 |

The organics and bentonite are plasticizers and are needed to obtain properties required by the forming process used.

The machinability of the products formed from the inventive compositions has been demonstrated, for example, by taking a cylindrical tube dried at 200° F. (366.5° K.) and turning a continuous thread on one end of the tube while the opposite end is tapered on a lathe. Samples of board formed in accordance with inventive composition have been evaluated for machinability by aluminum producers and the machinability thereof rated as excellent.

The preferred embodiments of the inventive compositions include alumino silicate ceramic fiber in the range of 48 to 60 weight percent, kaolin clay in the range of 22 to 40 weight percent and bentonite or ball clay in the range of 8 to 22 weight percent. The amount of the fiber should not exceed 80 weight percent in order to preclude processing difficulties and strength problems. Fiber levels below 30 weight percent would not have much advantage over clay compositions in that they would be very dense and would not be resistant to thermal shock. For similar reasons, the preferred limits of clay are 20 weight percent minimum and 70 weight percent maximum.

TABLE I
COMPOSITIONS DISPLAYING MOLTEN ALUMINUM RESISTANCE

|  | 1 | 2 | 3 | 4 |
| --- | --- | --- | --- | --- |
| Mix Composition, Weight % |  |  |  |  |
| Alumino-Silicate Fiber | 42.86 | 41.13 | 40.10 | 43.61 |
| Kaolin Clay | 34.29 | 30.85 | 32.09 | 34.88 |
| Jackson Ball Clay | 8.57 | 12.85 | 8.02 | 8.72 |
| Marisperse 43 | 5.71 | 5.14 | 5.35 | — |
| Mobilcer C | 8.57 | 77.71 | 8.02 | — |
| Chrome-Phosphate Binder | — | 2.32 | 6.42 | — |
| Alumina Hydrate Binder | — | — | — | 11.63 |
| Nitric Acid | — | — | — | 1.16 |
| TOTAL | 100 | 100 | 100 | 100 |
| Water, weight % | 21.43 | 24.16 | 20.05 | 37.79 |

TABLE II
REPRESENTATIVE COMPOSITIONS AND PROPERTIES

|  | 1 | 2 | 3 |
| --- | --- | --- | --- |
| Mix Composition, Weight % |  |  |  |
| Alumino-silicate fiber | 52.91 | 50.97 | 54.06 |
| Kaolin clay | 28.22 | 27.18 | 9.00 |
| Bentonite or ball clay | 14.11 | 13.59 | 32.43 |
| Marisperse 43 | 3.81 | 7.34 | 4.51 |
| Mobilcer C | 0.95 | 0.92 | — |
| TOTAL | 100 | 100 | 100 |
| Water, Weight % | 22.93 | 18.9 | 36.03 |
| Shrinkage, % |  |  |  |
| 200° F. (366.5° K.), 16 hours | 2.8–3.6 | 3.5 | 1.6–2.2 |
| 1500° F. (1089.0° K.), 4 hours | 3.2–4.0 | — | 2.4–3.0 |
| Density, pcf(kg/m³) |  |  |  |
| Extruded | 120–122 (1922.2–1954.2) | — | 97–101 (1553.8–1617.9) |
| Dry | 105–109 (1681.9– | 107 (1714.0) | — |

TABLE II-continued
REPRESENTATIVE COMPOSITIONS AND PROPERTIES

| | 1 | 2 | 3 |
|---|---|---|---|
| Fired at 1500° F. (1089.0° K.) for 4 hours | 1746.0) 100–102 (1601.8– 1633.9) | — | 93–94 (1489.7– 1505.7) |
| Modulus of Rupture, psi(MPa) Dry | 1330– 1480 (9.170– 10.204) | — | — |
| Fired at 1500° F. (1089.0° K.) for 4 hours | 1008– 1155 (6.950– 7.963) | — | 894– 1050 (6.164– 7.239) |

We claim:

1. A fibrous refractory product for handling molten aluminum, free from asbestos, and being chemically inert to molten aluminum and its alloys prepared by the process of mixing the ingredients consisting essentially of
  (a) 30 to 80 weight percent of aluminosilicate fiber; and
  (b) 20 to 70 weight percent of kaolin clay; adding water, shaping the mix, and drying said shaped form at a temperature of less than 200° F. to remove mechanical water and form an unfired part, machining the unfired part, and firing the machined part at an elevated temperature of about 1,500° F. to transform the clay into the amorphous metakaolin phase.

* * * * *